US012107341B2

(12) United States Patent
Ignatenko et al.

(10) Patent No.: US 12,107,341 B2
(45) Date of Patent: Oct. 1, 2024

(54) SEGMENTED ULTRA-WIDEBAND ANTENNA SYSTEM AND METHOD OF OPERATING THE SAME

(71) Applicant: CUSTOM MICROWAVE INC., Longmont, CO (US)

(72) Inventors: Maxim Vladimirovich Ignatenko, Superior, CO (US); Philip Elwood Venezia, Longmont, CO (US); Sudhakar Krothapalli Rao, Rancho Palos Verdes, CA (US); Clency Lee-Yow, Niwot, CO (US); Richard Malcolm Dart, Arvada, CO (US)

(73) Assignee: Custom Microwave Incorporated, Longmont, CO (US)

( * ) Notice: Subject to any disclaimer, the term of this patent is extended or adjusted under 35 U.S.C. 154(b) by 0 days.

(21) Appl. No.: 18/611,638

(22) Filed: Mar. 20, 2024

(65) Prior Publication Data

US 2024/0235021 A1 Jul. 11, 2024

(51) Int. Cl.
*H01Q 1/12* (2006.01)
*H01Q 5/25* (2015.01)
*H01Q 19/19* (2006.01)

(52) U.S. Cl.
CPC ............. *H01Q 5/25* (2015.01); *H01Q 1/1228* (2013.01)

(58) Field of Classification Search
CPC ........ H01Q 1/12; H01Q 1/1228; H01Q 19/19; H01Q 3/08; H01Q 5/25; H01Q 13/00; H01Q 15/16
See application file for complete search history.

(56) References Cited

U.S. PATENT DOCUMENTS

| | | | | |
|---|---|---|---|---|
| 5,844,527 A * | 12/1998 | Takashima | H01Q 15/141 | 343/781 CA |
| 6,492,955 B1 * | 12/2002 | Amyotte | H01Q 3/20 | 343/765 |
| 6,512,485 B2 * | 1/2003 | Luly | H01Q 1/247 | 343/781 CA |
| 6,522,305 B2 * | 2/2003 | Sharman | H01Q 19/021 | 343/781 CA |
| 10,680,341 B1 * | 6/2020 | Anderson | H01Q 15/16 | |
| 11,069,973 B1 * | 7/2021 | Veysoglu | H01Q 3/20 | |
| 11,088,461 B1 * | 8/2021 | Lee-Yow | H01Q 1/1235 | |

* cited by examiner

*Primary Examiner* — Tho G Phan
(74) *Attorney, Agent, or Firm* — Novel Patent Services

(57) ABSTRACT

A segmented ultra-wideband antenna system that facilitates communication with aircraft, satellites, ships, and other ground terminals over the frequency range varies between 1 GHz and 50 GHz while maintaining a bandwidth ratio of 50:1. The segmented ultra-wideband antenna system comprises a platform having a circular shape structure configured to affix plurality of antennas using one or more fasteners. The platform has a diameter of 24 inches for affixing the first antenna, the second antenna and the third antenna using fasteners. The plurality of antennas comprises a first antenna, a second antenna and a third antenna. The segmented ultra-wideband antenna system having a bandwidth ratio of 50:1. The segmented ultra-wideband antenna system achieves gain values from 6 dBi to 41 dBi. The segmented ultra-wideband antenna system is portable on ground and weighs less than 50 lbs.

22 Claims, 9 Drawing Sheets

SEGMENTED ULTRA-WIDEBAND ANTENNA SYSTEM AND METHOD OF OPERATING THE SAME

FIELD OF THE INVENTION

The present disclosure relates generally to communications via microwave transmission in a communication network, and more particular to a segmented ultra-wideband antenna system that facilitates communication with aircraft, satellites, ships, and other ground terminals over the frequency range of 1 GHz to 50 GHz while maintaining a bandwidth ratio of 50:1.

BACKGROUND

Generally, satellites are launched into low, medium, or geostationary earth orbits for various applications relating to terrestrial, nautical, aeronautical, civil, and commercial communication, navigation, exploration, and observation, scientific research, and others. The satellites transmit radio frequency (RF) signals related to their operations. The satellite RF signals may be collected, interpreted, and processed by terrestrial satellite transceivers (transmitters or receivers) operable for exchanging signals with the satellites or other entities. Similarly, RF signals from aircrafts and ships may be collected and processed by the UWB antenna and associated hardware including digital processor and modem for detection, verification and action.

The imminent widespread commercial deployment of ultra-wideband (UWB) systems has sparked renewed interest in the subject of ultra-wideband antennas. According to the Federal Communication Commission's (FCC) power levels, every decibel (dB) of antenna gains matters in a UWB system, as much as or perhaps even more so than in a standard narrowband system. Thus, an effective UWB antenna is a critical part of an overall UWB system design. The UWB antennas operate across an exceptionally wide frequency range, typically spanning several gigahertz. The UWB antennas can transmit and receive signals over a wide frequency spectrum providing increased capacity to the communication system.

The UWB antennas are well suited for positioning and tracking systems due to their fine time resolution and accuracy. When combined with multiple-input multiple-output (MIMO) technology, UWB antennas offer additional benefits and improvements in communication systems. MIMO UWB systems utilize multiple antennas at both the transmitting and receiving ends to enhance data throughput, system capacity, and link reliability. By exploiting the spatial domain, MIMO UWB systems can effectively mitigate multipath fading and interference and improve overall signal quality.

The benefits of MIMO UWB antennas include increased data rates, extended coverage range, and improved system robustness. By employing multiple antennas, MIMO UWB systems can achieve spatial multiplexing, allowing for the simultaneous transmission of multiple data streams over the same frequency band. The MIMO UWB antennas provide an improved coverage range by leveraging spatial diversity. By receiving signals from multiple paths and intelligently combining them, these antennas effectively combat the challenges posed by fading and signal attenuation, ensuring reliable communication even in challenging environments.

Traditionally, a wideband dual-polarized antenna array system with a minimal number of RF ports enables wideband array frequency ratios of 10:1 to 20:1. Reduced grating lobe performance is enabled by employing antennas-within-antennas. Orientation and spacing of antennas in novel methodologies further reduce sidelobes and grating lobes. Finally, this technology reduces the number of RF ports, compared to Tightly Coupled Dipole Antenna (TCDA) arrays by 10× to 25× times. However, the wideband dual-polarized antenna array system obtains loss due to the presence of multiple antennas and combining losses.

In existing technology, a multi-frequency band antenna is known. The multi-frequency band antenna comprises a high-band antenna, a middle-band antenna, a low-band antenna and a base. In particular, the high-band antenna, the middle-band antenna and the low-band antenna are positioned on the base from top to bottom. The high-band antenna, the middle-band antenna and the low-band antenna are configured to transmit and receive high-frequency band RF signals, middle-frequency band RF signals and low-frequency band RF signals to a combiner through a first feeder line, a second feeder line and a third feeder line respectively. The combiner combines the different frequency bands so that the UW multi-band antenna is realized. However, the multi-frequency band antenna utilizes the combiner, which is complex in design.

Therefore, there is a need for a segmented ultra-wideband antenna system to reduce losses caused by the presence of multiple antennas. There is also a need for a segmented ultra-wideband antenna system that does not utilize any combiner for transmitting multiple frequency band RF signals. There is also a need for a portable segmented ultra-wideband antenna system that is designed simply without the need for bulky components with minimal mass. Further, there is also a need for a segmented ultra-wideband antenna system that utilizes multiple antennas, which offer dual polarization to enhance capacity.

SUMMARY OF THE INVENTION

The following presents a simplified summary of one or more embodiments of the present disclosure in order to provide a basic understanding of such embodiments. This summary is not an extensive overview of all contemplated embodiments and is intended to neither identify key nor critical elements of all embodiments, nor delineate the scope of any or all embodiments.

The present disclosure, in one or more embodiments, relates to a segmented ultra-wideband antenna system that is required for ground applications to provide maritime communications with aircrafts, satellites and other ground terminals. The segmented ultra-wideband antenna system comprises a platform having a circular shape structure configured to affix plurality of antennas using one or more fasteners.

In one embodiment herein, the plurality of antennas comprises a first antenna, a second antenna and third antenna. The platform having a diameter of 24 inches for affixing the first antenna, the second antenna and the third antenna using fasteners. The antenna system is portable and is mounted on a tripod stand with bi-axial gimbal mechanisms to scan the beams over the forward horizon covering+/−90 degrees in both elevation and azimuthal axes independently.

In one embodiment herein, the first antenna is a dual reflector antenna. The first antenna having a main parabolic reflector with an axially displaced ellipsoid (ADE) sub-reflector is configured to transmit and receive high-band radio frequency signals. The diameter of the first antenna is 12 inches for transmitting and receiving high-band radio frequency signals. The first antenna is configured to operate at a frequency range that varies between 20 GHz and 50 GHz.

In one embodiment herein, the second antenna is a ridged conical horn antenna. The second antenna has a circular horn antenna and is configured to transmit and receive medium-band radio frequency signals. The diameter of the second antenna is 6 inches for transmitting and receiving medium-band radio frequency signals. The second antenna is configured to operate at a frequency range that varies between 8 GHz and 20 GHz.

In one embodiment herein, the third antenna comprises a primary ridged horn and a secondary ridged horn antenna and is configured to transmit and receive low-band radio frequency signals. In one embodiment herein, the primary ridged horn antenna having a rectangular-shaped flare and is configured to transmit and receive low-band radio frequency signals from upper ridge and lower ridge in top and bottom directions respectively, thereby providing vertical polarization.

In one embodiment herein, the secondary ridged horn antenna having a rectangular-shaped flare and is configured to transmit and receive low-band radio frequency signals from left ridge and right ridge in left and right directions respectively, thereby providing horizontal polarization. Each of the third antenna has a vertical polarization (VP) and a horizontal polarization (HP) port for producing both horizontal and vertical polarized signals. Each of the third antenna has dimensions of 6×9 inches for transmitting and receiving low-band radio frequency signals. The third antenna is configured to operate at a frequency range that varies between 1 GHz and 8 GHz.

In one embodiment herein, the controller is configured to auto-select at least one of the first antenna, the second antenna and the third antenna for transmitting and receiving multiple range frequency signals. In one embodiment herein, the first antenna, the second antenna and the third antenna offer dual polarizations for enhancing the capacity of the segmented ultra-wideband antenna system. The first antenna and the second antenna provide at least two radio frequency (RF) ports each to produce wideband radio frequency signals with Right Hand Circular Polarization (RHCP) and Left-Hand Circular Polarization (LHCP). The third antenna provides at least two radio frequency (RF) ports including a Vertical Polarization (VP) and a Horizontal Polarization (HP).

In one embodiment herein, the segmented ultra-wideband antenna system having a bandwidth ratio of 50:1. The segmented ultra-wideband antenna system achieves gain values from 6 dBi to 41 dBi. The segmented ultra-wideband antenna system is portable and weighs less than 50 lbs. In one embodiment herein, the segmented ultra-wideband antenna system comprises a gimbal is pivotally supported the platform enables an operator to rotate the platform in 2-axis for transmitting and receiving the radio frequency signals in a desired direction. The gimbal is mounted on a tripod structure with adjustable height for adjusting height based on user requirements. The tripod structure is quickly assembled and disassembled on a base by a single operator in the field.

In one embodiment herein, a method of operating the segmented ultra-wideband antenna system is disclosed. In one embodiment herein, the method comprises the steps of: at one step, the controller actuates the first antenna of the segmented ultra-wideband antenna system for receiving or transmitting the high-band radio frequency signals at a frequency range varies between 20 GHz and 50 GHz. At another step, the controller actuates the second antenna for receiving or transmitting the medium-band radio frequency signals at a frequency range varies between 8 GHz and 20 GHz.

At another step, the controller actuates the third antenna of the segmented ultra-wideband antenna system for receiving or transmitting the medium-band radio frequency signals at a frequency range varies between 1 GHz and 8 GHz. Finally, at another step, the controller actuates any two or the plurality of antennas simultaneously for transmitting and receiving radio frequency signals. The plurality of antennas can also be simultaneously operated by covering the entire spectrum from 1 GHz to 50 GHz.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

The accompanying drawings, which are incorporated in and constitute a part of the specification, illustrate an embodiment of the invention, and, together with the description, explain the principles of the invention.

DETAILED DESCRIPTION

Figure 1A:
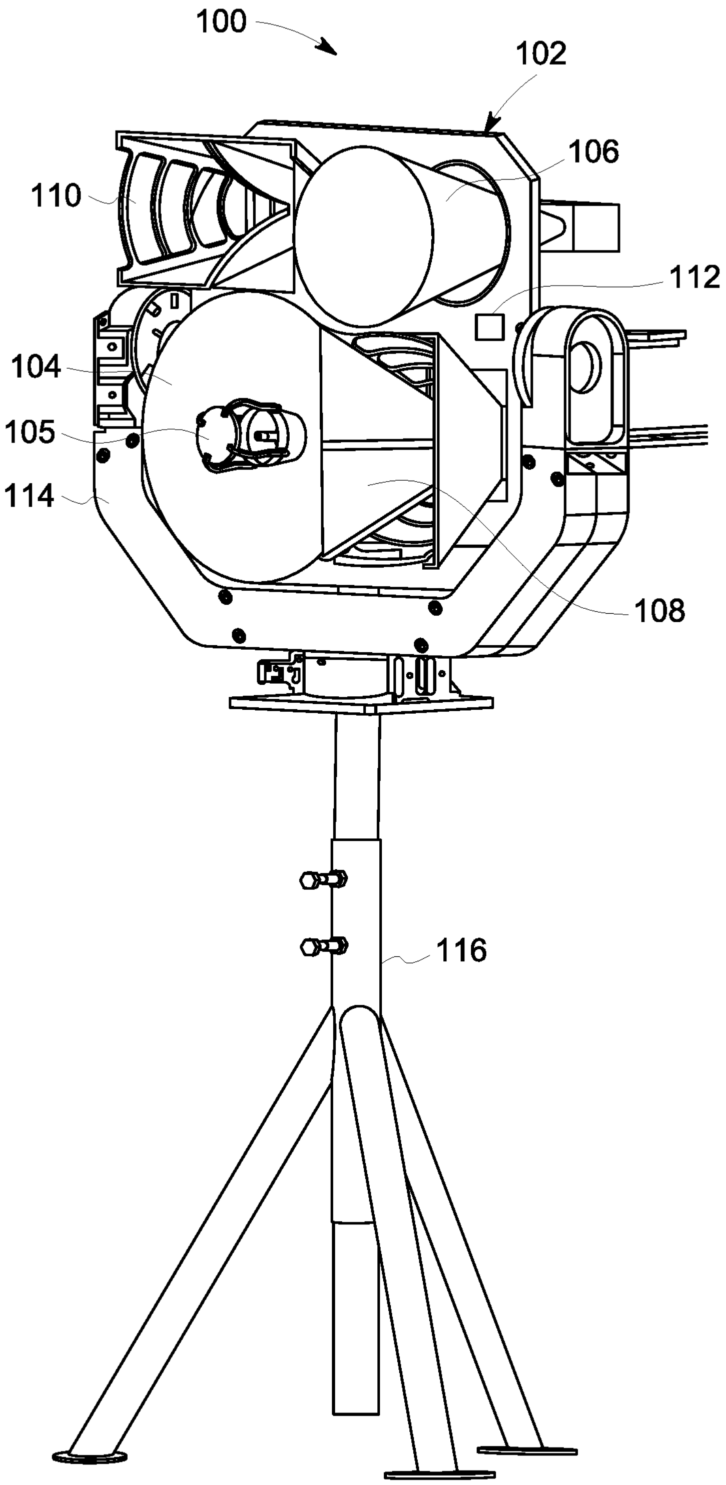
FIG. 1A illustrates a perspective view of a segmented ultra-wideband antenna system for transmitting and receiving multiple frequency signals, in accordance with embodiments of the invention.

Reference will now be made in detail to the present preferred embodiments of the invention, examples of which are illustrated in the accompanying drawings. Wherever possible, the same reference numerals are used in the drawings and the description to refer to the same or like parts.

FIG. 1A refers to a perspective view of a segmented ultra-wideband antenna system 100 for transmitting and receiving multiple frequency signals. In one embodiment herein, the segmented ultra-wideband antenna system 100 comprises a platform 102 having a circular shape structure or a rectangularly shaped structure with corner cuts to affix a plurality of antennas using one or more fasteners. In particular, a diameter of the platform 102 can be, but not limited to, 24 inches. In one embodiment herein, the plurality of antennas comprises a first antenna 104, a second antenna 106, a third antenna (108, 110), and a controller 112. The fasteners comprise, but not limited to, nuts, bolts, and an adjustable joint.

In one embodiment herein, the first antenna 104 is a dual reflector antenna. The first antenna 104 is configured with a main parabolic reflector and an axially displaced ellipsoid (ADE) sub-reflector 105. The first antenna 104 is configured to transmit and receive the high-band radio frequency signals at a frequency range varies between 20 GHz and 50 GHz. In one embodiment herein, the diameter of the first antenna 104 can be, but not limited to, 12 inches for transmitting and receiving the high-band radio frequency signals. The first antenna 104 is configured to operate at a frequency range varies between 20 GHz and 50 GHz.

In one embodiment herein, the second antenna 106 is a ridged conical horn antenna. The second antenna 106 having a circular horn antenna and is configured to transmit and receive medium-band radio frequency signals at a frequency range varies between 8 GHz and 20 GHz. In one embodiment herein, the diameter of the second antenna 106 can be, but not limited to, 6 inches for transmitting and receiving medium-band radio frequency signals. The second antenna 106 is configured to operate at a frequency range varies between 8 GHz and 20 GHz.

In one embodiment herein, the first antenna 104 and the second antenna 106 provide at least two radio frequency (RF) ports to produce wideband radio frequency signals. In particular, the at least two radio frequency (RF) ports include a right-hand circular polarization (RHCP) and a left-hand circular polarization (LHCP).

In one embodiment herein, the third antenna (108, 110) having two rectangularly shaped horn antennas and are configured to transmit and receive the low-band radio frequency signals. In particular, the third antenna (108, 110) comprises a primary ridged horn antenna 108 and a secondary ridged horn antenna 110.

In one embodiment herein, the primary ridged horn antenna 108 having a rectangular-shaped flare is configured to transmit and receive the low-band radio frequency signals from upper ridge and lower ridge in top and bottom directions, respectively, thereby supporting vertical polarization. In one embodiment herein, the secondary ridged horn antenna 110 having a rectangular-shaped flare is configured to transmit and receive the low-band radio frequency signals from left ridge and right ridge in left and right directions, respectively, thereby supporting horizontal polarization.

In one embodiment herein, each of the third antenna (108, 110) having a vertical polarization (VP) and a horizontal polarization (HP) port for producing both horizontal and vertical polarized signals. In one embodiment herein, the third antenna (108, 110) having dimensions of at least 6×9 inches for transmitting and receiving the low-band radio frequency signals. The third antenna (108,110) is configured to operate at a frequency range varies between 1 GHz and 8 GHz.

In one embodiment herein, the controller 112 is configured to auto-select at least one of the first antenna 104, the second antenna 106 and the third antenna 108 for transmitting and receiving the multiple range radio frequency signals at a frequency range varies between 1 GHz and 50 GHz. In another embodiment, the controller 112 is configured to automatically select any two or more antennas from the plurality of antennas, which includes the first antenna 104, the second antenna 106, and the third antenna 108.

In one embodiment herein, the segmented ultra-wideband antenna system 100 having a bandwidth ratio of at least 50:1. The segmented ultra-wideband antenna system 100 achieves gain values ranging from about 6 dBi to 41 dBi. In one embodiment herein, the segmented ultra-wideband antenna system 100 is portable and weighs less than 50 lbs. In one embodiment herein, the first antenna 104, the second antenna 106 and the third antenna (108, 110) offer dual polarizations for enhancing the reception and transmission capability of the segmented ultra-wideband antenna system 100.

In one embodiment herein, the segmented ultra-wideband antenna system 100 is equipped with a gimbal 114 that is pivotally supported on the platform 102. The gimbal 114 allows the operator to rotate the platform in 2 axes, which is useful for transmitting and receiving radio frequency signals in a desired direction. The segmented ultra-wideband antenna system 100 also features a tripod structure 116 with adjustable height for added convenience. This allows the operator to adjust the height of the segmented ultra-wideband antenna system 100 to meet specific requirements. The tripod structure 116 is designed to be quickly assembled and disassembled by a single operator, thereby making it easy and efficient to set up the segmented ultra-wideband antenna system 100 in the field.

In one embodiment herein, the tripod structure 116 is a three-legged stand, which is used to support the gimbal 114. The tripod structure 116 can be made up of either graphite or fiberglass and is designed to remain strong and stable even in windy conditions. The tripod structure 116 also enables the gimbal 114 to be positioned at a specific height and angle, which is essential to improving gain and directionality. This versatile design makes the tripod structure 116 suitable for various applications, such as radio frequency identification (RFID) and wireless communication.

In one example embodiment as shown in FIG. 1A, a feed is located at a focal point of the dual reflector antenna 104. The feed emits electromagnetic waves to the axially displaced ellipsoid (ADE) 105, which reflects the waves onto the dual reflector antenna 104. The reflected waves obtained from the ADE sub-reflector 105 illuminate the main reflector, except for the centrally blocked region (shadowed by the feed and sub-reflector). This design results in increased antenna gain, which is beneficial for improving the speed and quality of the signal transmission.

In one embodiment herein, the dual reflector antenna 104 with the axially displaced ellipsoid (ADE) 105 functionality is a type of antenna that utilizes two reflectors to focus and direct electromagnetic waves The parabolic reflector antenna 104 functions as the main reflector, and the ADE 105 functions as the sub-reflector. This displacement allows the dual reflector antenna 104 to achieve various advantages such as high gain, compact size, wide bandwidth and reduced spill over losses. The dual reflector antenna 104 with the axially displaced ellipsoid (ADE) 105 is suitable for multiple applications such as satellite communication, Radar, radio astronomy and medical imaging, etc.

Figure 1B:
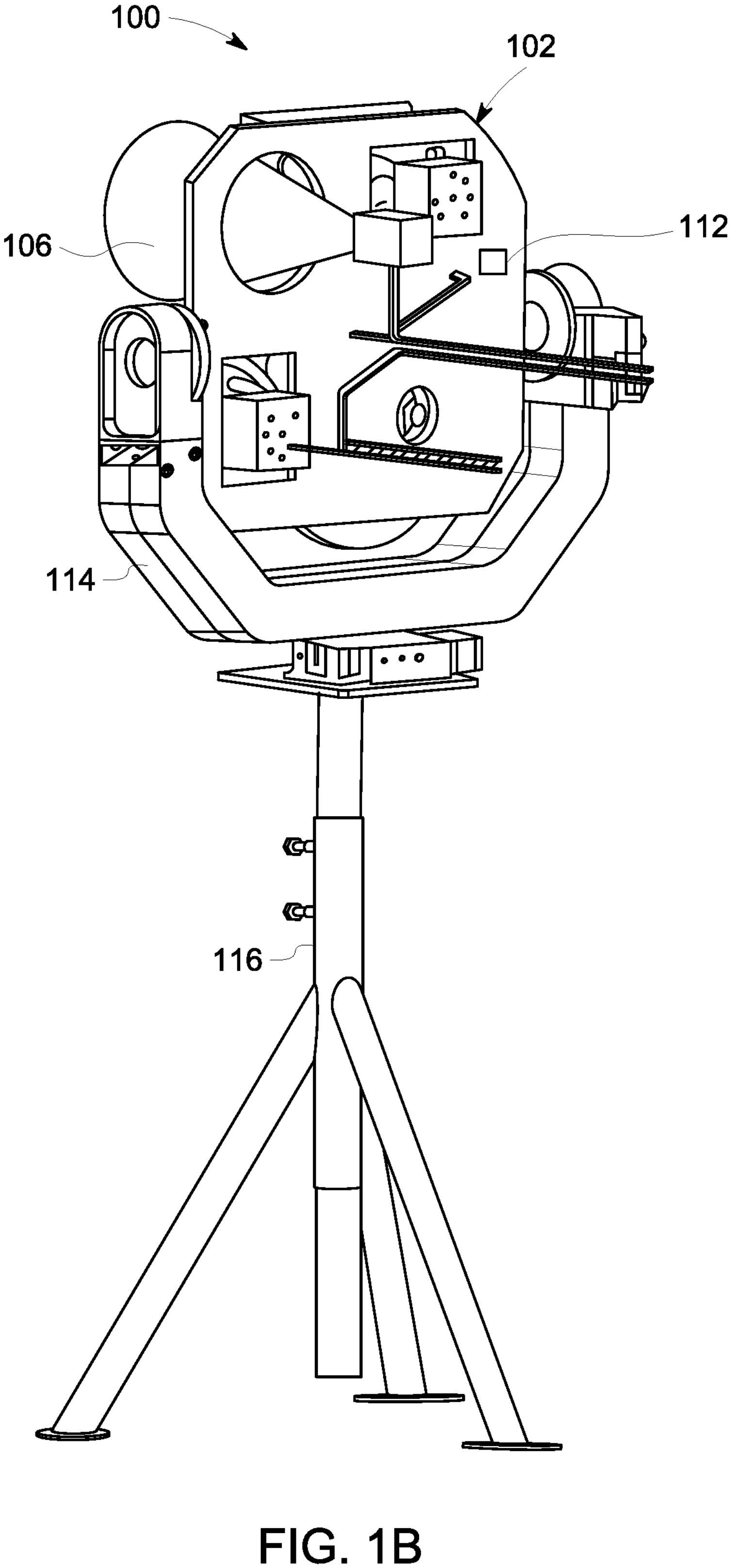
FIG. 1B illustrates a rare view of a segmented ultra-wideband antenna system for transmitting and receiving multiple frequency signals, in accordance with embodiments of the invention.

FIG. 1B refers to a rear view of a segmented ultra-wideband antenna system 100 for transmitting and receiving the multiple frequency signals. In one embodiment herein, the second antenna 106 is a ridged conical horn antenna. The ends of the ridged conical horn antenna 106 are widened, thereby achieving large directivity so that the emitted signal can be easily transmitted to long distances. The ridged conical horn antenna 106 having a flared waveguide for transmitting and receiving the RF microwave signals. Usually, ridged conical horn antenna 106 is used in combination with waveguide feeds and direct radio waves within a narrow beam. The ridged conical horn antenna 106 is simply used through cylindrical waveguides. In another embodiment herein, the circular horn antenna 106 can be a multi-mode horn to increase the gain.

In one embodiment herein, the third antenna (108, 110) comprises the primary ridged horn antenna 108 and a secondary ridged horn antenna 110. The third antenna (108, 110) comprises a primary ridged horn antenna and a secondary ridged horn antenna. The ends of the third antenna (108, 110) are widened, thereby achieving large directivity so that the emitted signal can be easily transmitted to long distances. The primary ridged horn antenna 108 and the secondary ridged horn antenna 110 comprise flared waveguides for transmitting and receiving the RF microwave signals. Usually, the primary ridged horn antenna 108 and the secondary ridged horn antenna 110 are used in combination with waveguide feeds to directly transmit radio waves within a narrow beam.

In one example embodiment herein, the the primary ridged horn antenna 108 has a rectangular-shaped flare and is configured to both transmit and receive the low-band radio frequency signals from the upper and lower ridges in the top and bottom directions, respectively. The primary ridged horn antenna 108 having the vertical polarized (VP) ports to transmit the RF signals in the vertical direction for long distances.

In one example embodiment herein, the secondary ridged horn antenna 110 has a rectangular-shaped flare and is designed to transmit and receive the low-band radio frequency signals from the left and right ridges in the left and right directions, respectively. The secondary ridged horn antenna 110 having the horizontal polarized (HP) ports to transmit the RF signals in the horizontal direction for long distances.

In one embodiment herein, the feed is given to the first antenna 104 through a cable, the feed is given to the second antenna 106 and the third antenna (108, 110) through the waveguides, respectively, for transmitting and receiving the RF signals. In specific, the cable includes, but not limited to, a coaxial cable. The waveguides and the cable are connected to controller 112. In another embodiment herein, the controller 112 can automatically activate at least one or more of the plurality of antennas includes the first antenna 104, the second antenna 106 and the third antenna (108, 110) for transmitting the RF signals based on the produced data. In one embodiment herein, the segmented ultra-wideband antenna system 100 comprises at least six ports, which are connected through a digital beamforming network, associated filters, and a modem, respectively, to transmit and receive required waveforms for enabling communications.

TABLE 1

| Components | Mass (Lbs) | QTY | QTY mass (Lbs) | CG location from the aperture |
|---|---|---|---|---|
| First antenna, ADE | 2.6 | 1 | 2.6 | 1.12 |
| Second antenna, HE Horn | 2 | 1 | 2 | 5.9 |
| Third antenna, Pasternack horn | 3.53 | 2 | 7.06 | 5.2 |
| Hybrid for First antenna, ADE | 0.1 | 2 | 0.2 | NA |
| Coaxial cables (1 ft) | 0.04 | 6 | 0.24 | NA |
| Platform | 3.1 | 1 | 3.1 | NA |
| Gimbal and controller | 23.5 | 1 | 23.5 | NA |
| Tripod structure | 11.3 | 1 | 11.3 | NA |
| Total Mass | | | 49.0 | |

Table 1 depicts information about each component of the segmented ultra-wideband antenna system 100, specifically their masses, quantities, CG locations from the aperture, and quantity masses in Lbs. In one embodiment herein, the distance between the center of gravity (CG) and the aperture of the first antenna 104 is at least 1.12 inches and the mass of the first antenna 104 is at least 2.6 Lbs. The distance between the center of gravity (CG) and the aperture of the second antenna 106 is at least 5.9 inches and the mass of the second antenna 106 is at least 2 Lbs. The distance between the center of gravity (CG) and the aperture of the third antenna (108, 110) is 5.2 inches and the mass of each of the third antenna (108, 110) at least is 3.53 Lbs. The total mass of the segmented ultra-wideband antenna system 100 is at least 49 Lbs.

Figure 2A:
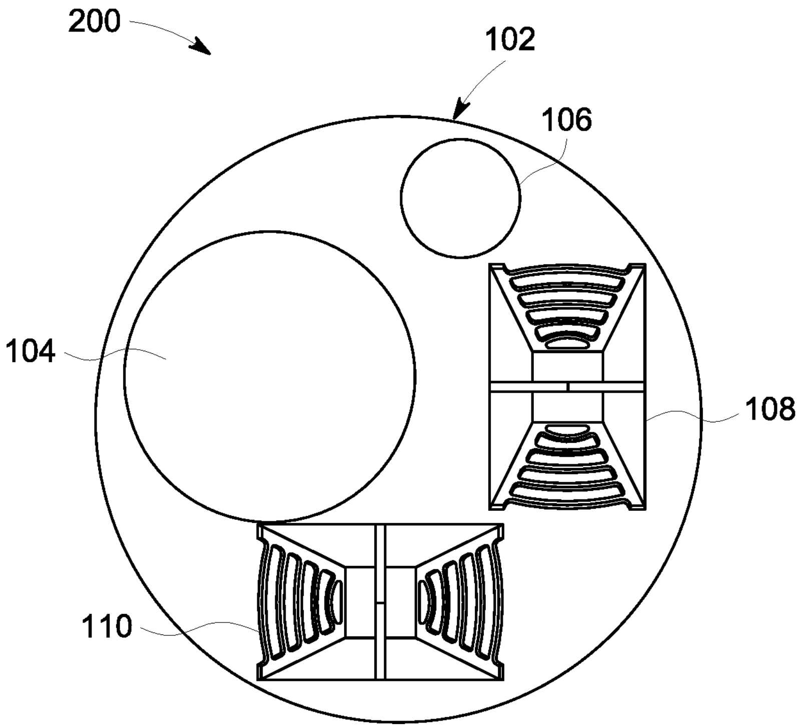
FIG. 2A illustrates a top view of a platform of the segmented ultra-wideband antenna system, in accordance with embodiments of the invention.

FIG. 2A refers to a top view of platform 102 of the segmented ultra-wideband antenna system 100. In one embodiment herein, the diameter of the platform 102 is at least, but not limited to, 24 inches. The platform 102 is configured to support the plurality of antennas includes the first antenna 104, the second antenna 106, and the third antenna (108, 110) for transmitting and receiving the RF signals. In one embodiment herein, the diameter of the first antenna 104 is at least 12 inches, the diameter of the second antenna 106 is at least 6 inches and the dimensions of the third antenna (108,110) are 6×9 inches.

Figure 2B:
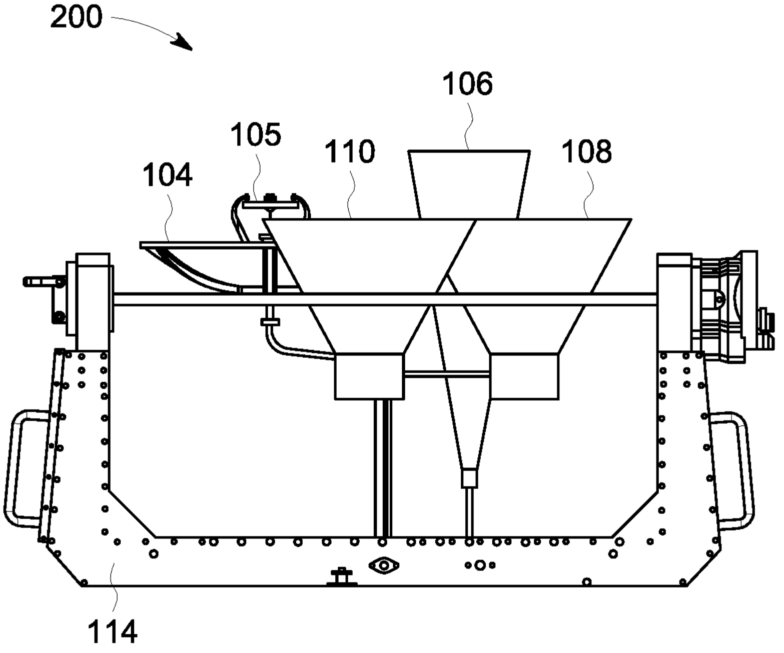
FIG. 2B illustrates a schematic view of a platform of the segmented ultra-wideband antenna system, in accordance with embodiments of the invention.
Figure 2C:
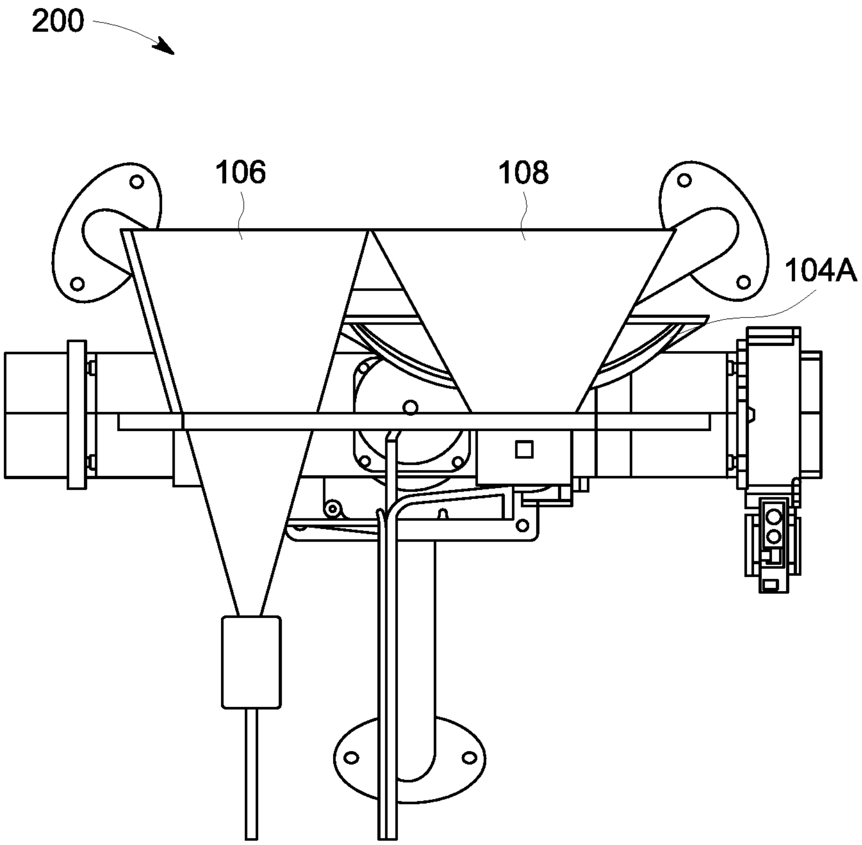
FIG. 2C illustrates a perspective view of a platform of the segmented ultra-wideband antenna system, in accordance with embodiments of the invention.

FIGS. 2B-2C refer to schematic and perspective views 200 of the platform 102 of the segmented ultra-wideband antenna system 100. In one embodiment herein, the platform 102 is affixed to both ends of the gimbal 114 through connecting members. In particular, the connecting members are configured to firmly secure the platform 102 while the gimbal 114 is adjusted. In specific, the feed is provided to the first antenna 104 and the second antenna 106 through the cable.

The feed is provided to the third antenna (108, 110) through channels through waveguides for transmitting and receiving the RF signals. In one embodiment herein, the waveguides of the third antenna (108, 110) are affixed to the platform 102 using the fasteners, which include, but not limited to, nuts, bolts, and an adjustable joint, etc. The gimbal 114 has one or more holders that allow the operator to manually adjust the direction of the segmented ultra-wideband antenna system 100 for transmitting and receiving the RF signals in the desired direction. In one embodiment herein, the gimbal 114 is made of using lightweight materials such as steel, iron, or other materials, etc.

Figure 3:
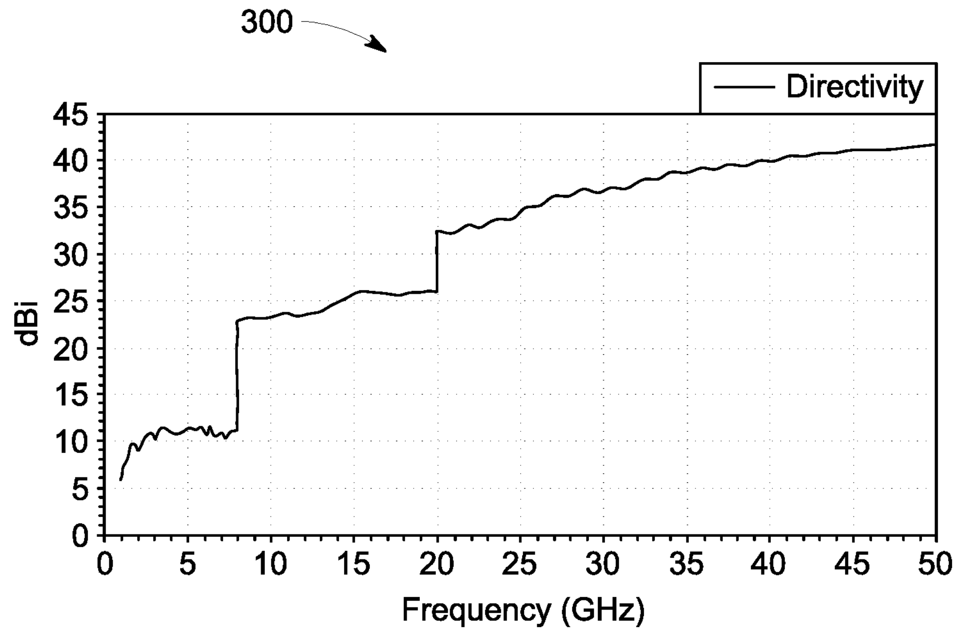
FIG. 3 illustrates a graphical plot of an antenna directivity for the segmented ultra-wideband antenna system at a frequency between 1 GHz to 50 GHz, in accordance with embodiments of the invention.

FIG. 3 refers to a graphical plot 300 of an antenna directivity for the segmented ultra-wideband antenna system 100 at a frequency range varies between 1 GHz to 50 GHz. In one embodiment herein, the horizontal axis represents frequency (GHz), and the vertical axis represents directivity (dBi). In one embodiment herein, the segmented ultra-wideband antenna system 100 achieves the directivity values ranges from 6 dBi to 41 dBi. For low-band radio frequency signals, the directivity achieved by the segmented ultra-wideband antenna system 100 is at least 6 dBi at a frequency of 1 GHz. As the frequency increases, the directivity of the segmented ultra-wideband antenna system 100 also increases. At a frequency of 8 GHZ, the directivity achieved by the segmented ultra-wideband antenna system 100 is at least 11 dBi.

In one embodiment herein, the segmented ultra-wideband antenna system 100 achieves a directivity of at least 23 dBi at the frequency of 9 GHZ, and at least 26 dBi at a frequency of 20 GHz for the transmission of the medium-band radio frequency signals. The segmented ultra-wideband antenna system 100 achieves a directivity of at least 33 dBi at the frequency of 20 GHz, and at least 42 dBi at the frequency of 50 GHz for the transmission of the high-band radio frequency signals.

Figure 4:
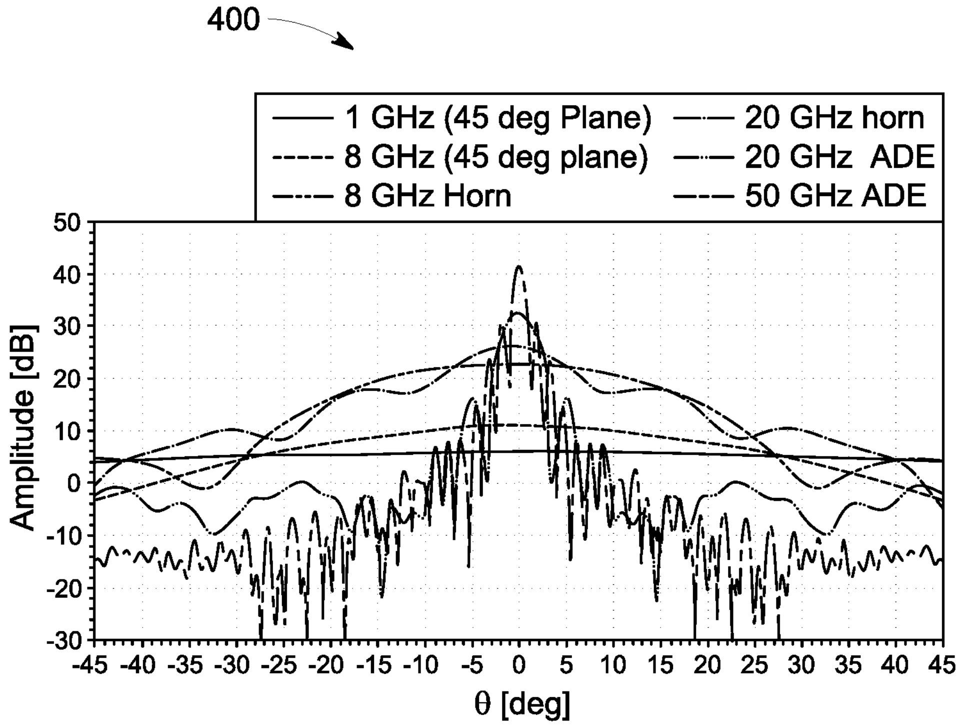
FIG. 4 illustrates a graphical representation of radiation patterns for the segmented ultra-wideband antenna system, in accordance with embodiments of the invention.

FIG. 4 refers to a graphical representation 400 of radiation patterns of the segmented ultra-wideband antenna system 100. The horizontal axis represents angle (θ) of the segmented ultra-wideband antenna system 100 and the vertical axis represents an amplitude (dB). In specific, the angle varies between −45 degrees and +45 degrees, and the amplitude varies between −30 dB and +50 dB.

In one embodiment, the controller 112 of the segmented ultra-wideband antenna system 100 can select the primary and secondary ridged horn antennas (108, 110), respectively, while transmitting the low-band RF signals. The maximum value of the amplitude maintained at the frequency of 1 GHz is at least 5 dBi. Further, the maximum value of the amplitude maintained at the frequency of 8 GHz is at least 11 dBi.

In one embodiment herein, the controller 112 of the segmented ultra-wideband antenna system 100 can select the second antenna i.e., ridged conical horn antenna 106 while transmitting the medium-band RF signals. The highest amplitude value achieved at a frequency of 8 GHz is at least 23 dBi at 0 degrees. Further, the highest amplitude value achieved at a frequency of 20 GHz is at least 26 dBi at 0 degrees. In one embodiment herein, the controller 112 of the segmented ultra-wideband antenna system 100 selects the first antenna 104 while transmitting the high-band RF signals. The highest amplitude value achieved at a frequency of 20 GHz is at least 32 dB at 0 degrees. Further, the highest amplitude value achieved at a frequency of 50 GHz is at least 41 dB at 0 degrees.

Figure 5A:
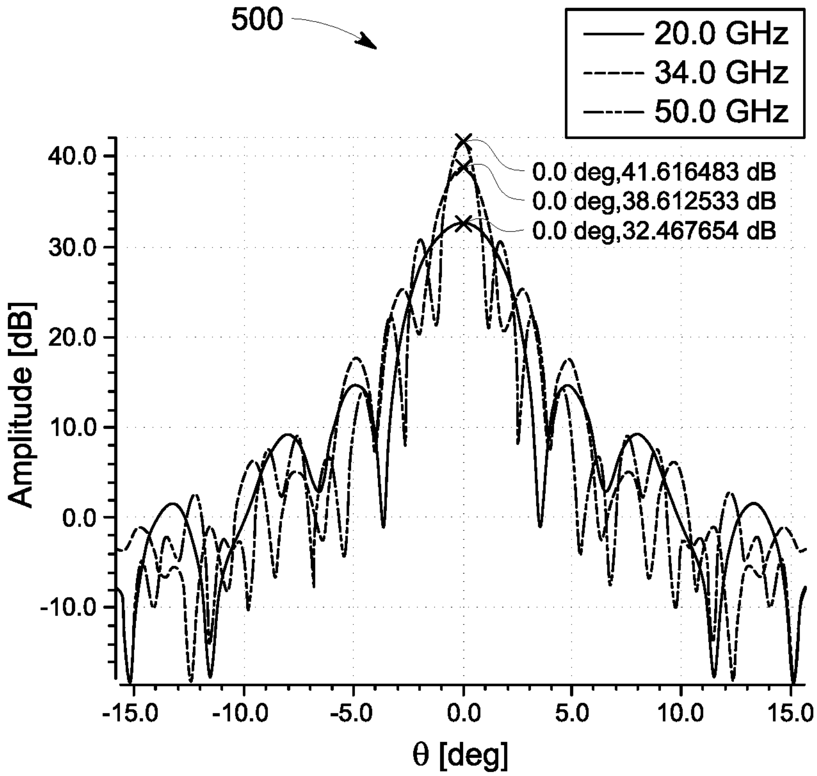
FIG. 5A illustrates a graphical representation of radiation patterns of a first antenna of the segmented ultra-wideband antenna system, in accordance with embodiments of the invention.

FIG. 5A refers to a graphical representation 500 of radiation patterns of the first antenna 104 of the segmented ultra-wideband antenna system 100. The horizontal axis represents angle (θ) of the segmented ultra-wideband antenna system 100 and the vertical axis represents an amplitude (dB). In specific, the angle varies between −15 degrees and +15 degrees, and the amplitude varies between −10 dB and +40 dB.

In one embodiment herein, the controller 112 can select the first antenna 104 with the axially displaced ellipsoid (ADE) sub-reflector 105 for transmitting the high-band RF signals. The highest amplitude value achieved at the frequency of 20 GHz is at least 32.5 dBi at 0 degrees. Further, the highest amplitude value achieved at the frequency of 34 GHz is at least 38.6 dBi at 0 degrees. Furthermore, the highest amplitude value achieved at the frequency of 50 GHZ is at least 41.6 dBi at 0 degrees.

Figure 5B:
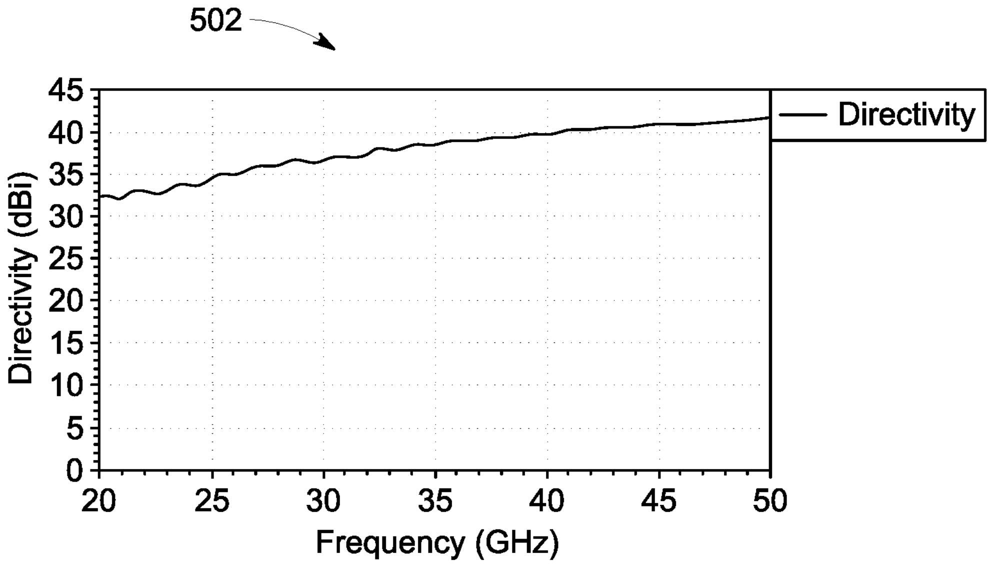
FIG. 5B illustrates a graphical plot of an antenna directivity for the first antenna of the segmented ultra-wideband antenna system at a frequency between 20 GHz to 50 GHz, in accordance with embodiments of the invention.

FIG. 5B refers to a graphical plot 502 of an antenna directivity for the first antenna 104 of the segmented ultra-wideband antenna system 100 at a frequency range varies between 20 GHz and 50 GHz. In one embodiment herein, the horizontal axis represents frequency (GHz), and the vertical axis represents directivity (dBi). In one embodiment herein, the first antenna 104 can be operated in the frequency range varies between 20 GHz and 50 GHz and the directivity ranges from 0 to 42 dBi.

In one embodiment herein, the segmented ultra-wideband antenna system 100 achieves a directivity at the frequency of 20 GHz is at least 33 dBi during the transmission of the high-band radio frequency signals. As the frequency increases the directivity of the segmented antenna system 100 also increases. Further, the segmented ultra-wideband antenna system 100 achieves the directivity at the frequency of 50 GHz is at least 42 dBi.

Figure 6A:
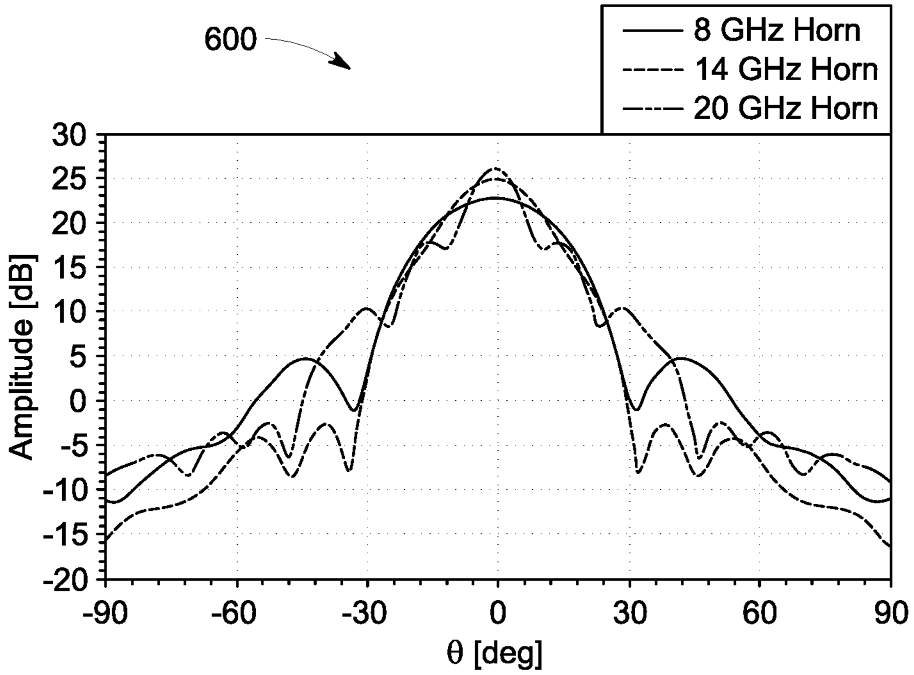
FIG. 6A illustrates a graphical representation of radiation patterns of a second antenna of the segmented ultra-wideband antenna system, in accordance with embodiments of the invention.

FIG. 6A refers to a graphical representation 600 of radiation patterns of the second antenna 106 of the segmented ultra-wideband antenna system 100. The horizontal axis represents the angle (θ) of the segmented ultra-wideband antenna system 100 and the vertical axis represents an amplitude (dB). In specific, the angle varies between −90 degrees and +90 degrees, and the amplitude varies from −20 dB to +30 dB.

In one embodiment herein, the controller 112 of the segmented ultra-wideband antenna system 100 can select the second antenna i.e., ridged conical horn antenna 106 for the transmission of the medium-band RF signals. In one embodiment herein, the segmented ultra-wideband antenna system 100 achieves the highest amplitude value at the frequency of 8 GHz is at least 22 dB at 0 degrees. Further, the segmented ultra-wideband antenna system 100 achieves the highest amplitude value at the frequency of 14 GHz is 25 dB at 0 degrees, and at the frequency of 20 GHz is 26 dB at 0 degrees.

Figure 6B:
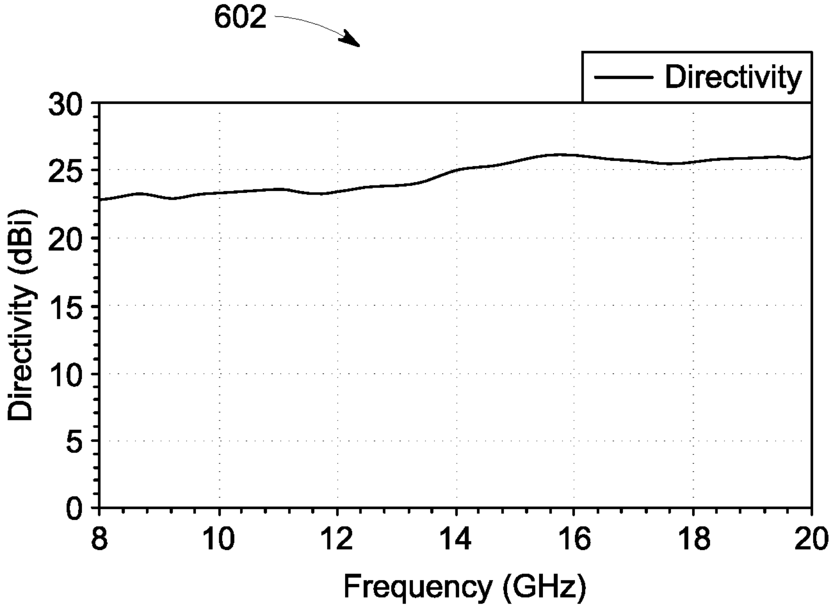
FIG. 6B illustrates a graphical plot of an antenna directivity for the second antenna of the segmented ultra-wideband antenna system at a frequency between 8 GHz to 20 GHz, in accordance with embodiments of the invention.

FIG. 6B refers to a graphical plot 602 of an antenna directivity for the second antenna 106 of the segmented ultra-wideband antenna system 100. In one embodiment herein, the horizontal axis represents the frequency (GHz), and the vertical axis represents the directivity (dBi). In one embodiment herein, the second antenna 106 is operated at a frequency range varies between 8 GHz and 20 GHz and the directivity ranges from 0 to 30 dBi.

In one embodiment herein, the segmented ultra-wideband antenna system 100 achieves the directivity at the frequency of 8 GHz is at least 23 dBi for the transmission of the medium-band radio frequency signals. Further, the segmented ultra-wideband antenna system 100 achieves the directivity at the frequency of 20 GHz is at least 26 dBi.

Figure 7A:
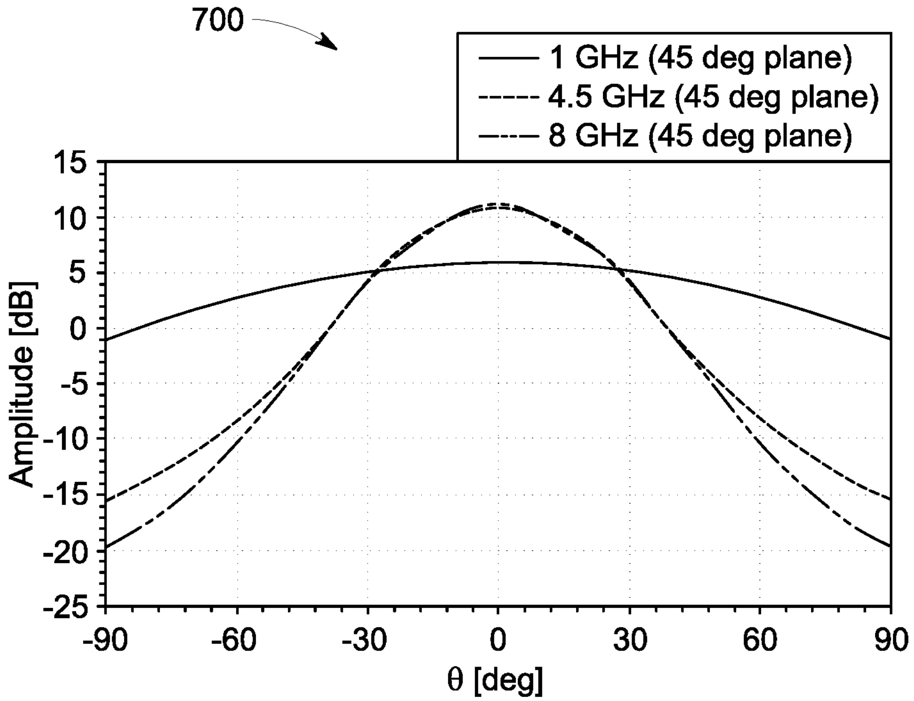
FIG. 7A illustrates a graphical representation of radiation patterns of third antenna of the segmented ultra-wideband antenna system, in accordance with embodiments of the invention.

FIG. 7A refers to a graphical representation 700 of radiation patterns of the third antenna (108, 110) of the segmented ultra-wideband antenna system 100. The horizontal axis represents the angle (θ) of the segmented ultra-wideband antenna system 100 and the vertical axis represents an amplitude (dB). In specific, the angle varies between −90 degrees and +90 degrees, and the amplitude varies from −25 dB to +15 dB.

In one embodiment herein, the controller 112 of the segmented ultra-wideband antenna system 100 selects the third antenna i.e., the primary and secondary ridged horn antennas (108, 110) for transmitting the low-band RF signals. In one embodiment herein, the segmented ultra-wideband antenna system 100 achieves the highest amplitude value at the frequency of 1 GHz is at least 6 dBi at 0 degrees. Further, the segmented ultra-wideband antenna system 100 achieves the highest amplitude value at the frequency of 4.5 GHz is at least 11 dBi at 0 degrees. Furthermore, the segmented ultra-wideband antenna system 100 achieves the highest amplitude value at the frequency of 8 GHz is at least 11 dBi at 0 degrees.

Figure 7B:
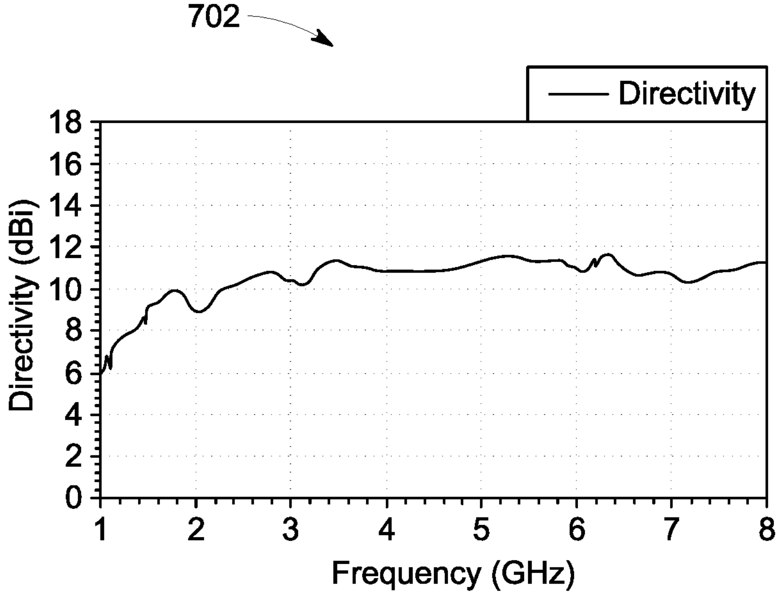
FIG. 7B illustrates a graphical plot of an antenna directivity for the third antenna of the segmented ultra-wideband antenna system at a frequency between 1 GHz to 8 GHz, in accordance with embodiments of the invention.

FIG. 7B refers to a graphical plot 702 of an antenna directivity for the third antenna (108, 110) of the segmented ultra-wideband antenna system 100. In one embodiment herein, the horizontal axis represents the frequency (GHz), and the vertical axis represents the directivity (dBi). In one embodiment herein, the third antenna (108, 110) is configured to operate at the frequency range varies between 1 GHz and 8 GHz and the directivity ranges from about 0 to 18 dBi.

In one embodiment herein, the segmented ultra-wideband antenna system 100 achieves the directivity at the frequency of 1 GHz is at least 6 dBi for the transmission of the low-band radio frequency signals. As the frequency increases the directivity of the segmented antenna system 100 fluctuates. Further, the segmented ultra-wideband antenna system 100 achieves the directivity at the frequency of 8 GHz is at least 11 dBi.

In one example embodiment herein, the proposed segmented ultra-wideband antenna system 100 further utilizes a driving unit for varying the position of the gimbal 114 for increasing the efficiency. In one embodiment herein, the driving unit could be electrically connected to the controller 112. In one embodiment herein, controller 112 is in communication with a computing device to enable the user for remotely operating the gimbal 114 to adjust the position of the segmented ultra-wideband system 100. The computing device includes at least one smartphone, a tablet, a computer, a personal digital assistant (PDA), and thereof.

Figure 8:
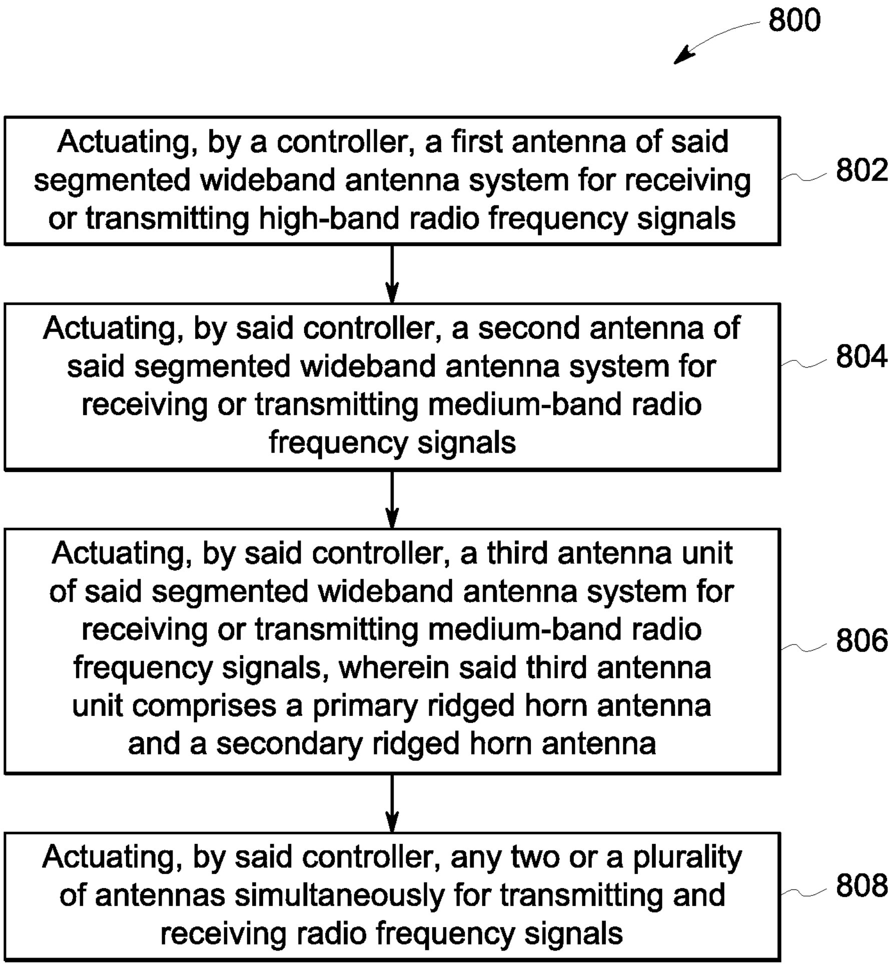
FIG. 8 illustrates a flowchart of a method for operating the segmented ultra-wideband antenna system, in accordance with one embodiment of the invention.

Referring to FIG. 8, a flowchart of a method of operating the segmented ultra-wideband antenna system 100 in one embodiment is disclosed. In one embodiment herein, the method comprises the steps of: at step 802, the controller 112 actuates the first antenna 104 of the segmented ultra-wideband antenna system 100 for receiving or transmitting the high-band radio frequency signals at the frequency range varies between 20 GHz and 50 GHz. At step 804, the controller 112 actuates the second antenna 106 of the segmented ultra-wideband antenna system 100 for receiving or transmitting the medium-band radio frequency signals at the frequency range varies between 8 GHz and 20 GHz.

Further, at step 806, the controller 112 actuates the third antenna (108, 110) of the segmented ultra-wideband antenna system 100 for receiving or transmitting the medium-band radio frequency signals at the frequency range varies between 1 GHz and 8 GHz. Yet, with another step 808, the controller 112 actuates at least two or the plurality of antennas includes the first antenna 104, the second antenna 106, and the third antenna (108, 110) simultaneously for transmitting and receiving the radio frequency signals at the frequency range varies between 1 GHz and 50 GHz. In one embodiment herein, the six ports of the plurality of antennas or at least four ports of at least two antennas can be activated for providing increased bandwidth varies from about 1 GHz to 50 GHz (maximum). In one embodiment herein, the first antenna 104, the second antenna 106, and the third antenna (108, 110) (low band, medium band and high band) are pivoted through a common bi-axial gimbal mechanism so that all beams are pointed in the same direction.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principles of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

It will readily be apparent that numerous modifications and alterations can be made to the processes described in the foregoing examples without departing from the principles underlying the invention, and all such modifications and alterations are intended to be embraced by this application.

What is claimed is:

1. A segmented ultra-wideband antenna system for multiple frequency bands, comprising:

a platform having a circular shape structure;

a plurality of antennas adapted to affix to said platform using one or more fasteners, wherein said plurality of antennas comprises:

- a first antenna having a main parabolic reflector with an axially displaced ellipsoid (ADE) sub-reflector configured to transmit and receive high-band radio frequency signals, wherein said first antenna is a dual reflector antenna;
- a second antenna having a circular horn antenna configured to transmit and receive medium-band radio frequency signals, wherein said second antenna is a ridged conical horn antenna;
- a third antenna configured to transmit and receive low-band radio frequency signals, wherein said third antenna comprise:

- a primary ridged horn antenna having a rectangular shaped flare configured to transmit and receive the low-band radio frequency signals from upper ridge and lower ridge in top and bottom directions, thereby supporting vertical polarization; and
- a secondary ridged horn antenna having a rectangular shaped flare configured to transmit and receive the low-band radio frequency signals from left ridge and right ridge in left and right directions, thereby supporting horizontal polarization; and
- a controller configured to auto-select at least one or more of said first antenna, said second antenna and said third antenna for transmitting and receiving multiple range radio frequency signals.

2. The segmented ultra-wideband antenna system of claim 1, wherein said segmented ultra-wideband antenna system having a bandwidth ratio of at least 50:1.

3. The segmented ultra-wideband antenna system of claim 1, wherein said segmented ultra-wideband antenna system is configured to achieve gain values varying between 6 dBi and 41 dBi.

4. The segmented ultra-wideband antenna system of claim 1, wherein said first antenna, said second antenna and said third antenna are adapted to provide dual polarizations for enhancing the capacity of said segmented ultra-wideband antenna system.

5. The segmented ultra-wideband antenna system of claim 1, wherein said first antenna and said second antenna are each provided with at least two radio frequency (RF) ports to produce wideband radio frequency signals, wherein said at least two radio frequency (RF) ports include a right-hand circular polarization (RHCP) and a left-hand circular polarization (LHCP).

6. The segmented ultra-wideband antenna system of claim 1, wherein each of said third antenna having a vertical polarization (VP) port and a horizontal polarization (HP) port for producing both horizontal and vertical polarized signals.

7. The segmented ultra-wideband antenna system of claim 1, wherein said first antenna having a diameter of at least 12 inches for transmitting and receiving the high-band radio frequency signals.

8. The segmented ultra-wideband antenna system of claim 1, wherein said second antenna having a diameter of at least 6 inches for transmitting and receiving the medium-band radio frequency signals.

9. The segmented ultra-wideband antenna system of claim 1, wherein each of said third antenna having dimensions of at least 6×9 inches for transmitting and receiving the low-band radio frequency signals.

10. The segmented ultra-wideband antenna system of claim 1, wherein said first antenna is configured to operate across a high range of frequency bands varies between 20 GHz and 50 GHz.

11. The segmented ultra-wideband antenna system of claim 1, wherein said second antenna is configured to operate across a medium range of frequency bands varies between 8 GHz and 20 GHz.

12. The segmented ultra-wideband antenna system of claim 1, wherein said primary ridged horn and said secondary ridged horn are configured to operate across a low range of frequency bands varies between 1 GHz and 8 GHz.

13. The segmented ultra-wideband antenna system of claim 1, wherein said platform having a diameter of at least 24 inches for supporting said first antenna, said second antenna and said third antenna.

14. The segmented ultra-wideband antenna system of claim 1, wherein said segmented ultra-wideband antenna system comprises a gimbal configured to pivotally support said platform, thereby enabling an operator to rotate and adjust said platform in at least two-axes for transmitting and receiving said radio frequency signals in a desired direction.

15. The segmented ultra-wideband antenna system of claim 14, wherein said gimbal is mounted on a tripod structure with adjustable height for adjusting height based on user requirements, wherein said tripod structure is quickly assembled and disassembled on a base by the operator.

16. A segmented ultra-wideband antenna system for multiple frequency bands, comprising:

a platform having a circular shape structure and a diameter of at least 24 inches;

a plurality of antennas adapted to affix to said platform using one or more fasteners, wherein said plurality of antennas comprises:

a first antenna with an axially displaced ellipsoid (ADE) sub-reflector configured to transmit and receive high-band radio frequency signals, wherein said first antenna is a dual reflector antenna;

a second antenna having a circular shaped flare configured to transmit and receive medium-band radio frequency signals, wherein said second antenna is a ridged conical horn antenna;

a primary ridged horn antenna having a rectangular shaped flare configured to transmit and receive low-band radio frequency signals from upper ridge and lower ridge in top and bottom directions, respectively;

a secondary ridged horn antenna having a rectangular shaped flare configured to transmit and receive the low-band radio frequency signals from left ridge and right ridge in left and right directions, respectively; and a controller configured to auto-select at least two or all of said first antenna, said second antenna and said third antenna for transmitting and receiving the multiple range radio frequency signals at the frequency range varies between 1 GHz and 50 GHZ, wherein said segmented ultra-wideband antenna system comprises a gimbal configured to pivotally support said platform, thereby enabling an operator to rotate and adjust said platform in at least two-axes for transmitting and receiving said radio frequency signals in a desired direction.

17. The segmented ultra-wideband antenna system of claim 16, wherein said gimbal is mounted on a tripod structure with adjustable height for adjusting height based on user requirements, wherein said tripod structure is quickly assembled and disassembled on a base by the operator.

18. The segmented ultra-wideband antenna system of claim 16, wherein said first antenna is configured to operate across a high range of frequency bands varies between 20 GHz and 50 GHZ, said second antenna is configured to operate across a medium range of frequency bands varies between 8 GHz and 20 GHz, and said primary ridged horn antenna and said secondary ridged horn antenna are configured to operate across a low range of frequency bands varies between 1 GHz and 8 GHz.

19. The segmented ultra-wideband antenna system of claim 16, wherein said segmented ultra-wideband antenna system having a bandwidth ratio of at least 50:1.

20. The segmented ultra-wideband antenna system of claim 16, wherein said first antenna, said second antenna and said third antenna are adapted to provide dual polarizations for enhancing the capacity of said segmented ultra-wideband antenna system.

21. The segmented ultra-wideband antenna system of claim 16, wherein said first antenna and said second antenna are provided with at least two radio frequency (RF) ports to produce wideband radio frequency signals, wherein said at least two radio frequency (RF) ports include a right-hand circular polarization (RHCP) and a left-hand circular polarization (LHCP).

22. The segmented ultra-wideband antenna system of claim 16, wherein each of said third antenna having a vertical polarization (VP) port and a horizontal polarization (HP) port for producing both horizontal and vertical polarized signals.

* * * * *